US005938558A

United States Patent [19]

Eybergen et al.

[11] Patent Number: 5,938,558

[45] Date of Patent: Aug. 17, 1999

[54] LIMITED SLIP DIFFERENTIAL AND IMPROVED DIFFERENTIAL HOUSING ASSEMBLY THEREFOR

[75] Inventors: William N. Eybergen, Windsor, Canada; Avinash C. Kavi, Taylor; Lawrence McAuliffe, Jr., Marshall, both of Mich.

[73] Assignee: Eaton Corporation, Cleveland, Ohio

[21] Appl. No.: 08/933,790

[22] Filed: Sep. 19, 1997

[51] Int. Cl.$^{6}$ .......................... F16H 48/06; F16H 48/22; F16H 57/02

[52] U.S. Cl. ......................... 475/231; 74/606 R; 403/375

[58] Field of Search .................................... 475/230, 231, 475/232, 234, 235, 237, 238, 239, 240; 403/375, 354, 272; 74/606 R, 607; 29/897.2, 463; 220/359.5, 612, 315, 690

[56] References Cited

U.S. PATENT DOCUMENTS

| | | | |
|---|---|---|---|
| 2,817,251 | 12/1957 | Stamm | 74/711 |
| 3,264,900 | 8/1966 | Hartupee | 74/606 R |
| 3,362,258 | 1/1968 | Thorton | 475/231 |
| 3,648,545 | 3/1972 | Clancey et al. | 74/710.5 |
| 4,221,138 | 9/1980 | Stewart et al. | 475/230 X |
| 4,612,825 | 9/1986 | Engle | 74/607 X |
| 4,882,949 | 11/1989 | Inoue | 74/714 |
| 5,019,021 | 5/1991 | Janson | 475/231 X |
| 5,404,772 | 4/1995 | Jester | 74/606 R |
| 5,480,360 | 1/1996 | Patzer et al. | 475/230 |
| 5,533,423 | 7/1996 | Stehle et al. | 74/606 R |
| 5,584,777 | 12/1996 | Sander et al. | 475/230 |
| 5,791,205 | 8/1998 | Rupert, Jr. | 74/606 R |

*Primary Examiner*—Charles A. Marmor
*Assistant Examiner*—Ankur Parekh
*Attorney, Agent, or Firm*—L. J. Kasper

[57] ABSTRACT

A differential housing assembly (11;81) including a first end cap (31;83) defining a plurality of openings (52,53,54;93). A housing (35;87,89) defines a plurality of tabs (72,73,74;95) which are received within the openings. Preferably, both the end cap and the housing comprise steel stampings, and the tabs are welded within the openings, such that the end cap and housing form an inexpensive, relatively light-weight, but extremely strong and durable differential housing assembly. In one embodiment, the housing member (35) is a generally U-shaped member, and in another embodiment, the housing (87) is a deep drawn tubular member.

15 Claims, 5 Drawing Sheets

LIMITED SLIP DIFFERENTIAL AND IMPROVED DIFFERENTIAL HOUSING ASSEMBLY THEREFOR

BACKGROUND OF THE DISCLOSURE

The present invention relates to differentials, and more particularly, to an improved design for a differential housing assembly.

The present invention may be utilized with various types of differentials, although it is especially advantageous when used with a limited slip differential, and will be described in connection therewith. Limited slip differentials of the type which can utilize the present invention typically include a gear case or differential housing defining a gear chamber, and disposed therein, a differential gear set. A clutch pack is typically disposed between the gear set and the differential housing, such that the clutch pack is operable to retard or even prevent relative rotation between the gear case and the output gears (side gears) of the gear set.

Typically, the differential housing has comprised a cast iron member, requiring a substantial amount of machining of various surfaces, diameters, etc. As is well known to those skilled in the art, the tensile strength of cast iron is somewhat limited, such that a load bearing member like a differential housing must comprise a fairly hefty casting, in order to be able to transmit the types of loads to which differentials are typically subjected. The need for a fairly sturdy housing casting is especially true in view of the need for access windows, through which the various gears and friction discs are inserted into the housing.

The primary disadvantage of the prior art limited slip differential of the type described, having the typical cast iron differential housing, is the excessive overall cost of manufacturing the differential.

There are now an increasing number of vehicle applications being identified for which it would be desirable to include a "traction modifier" such as a limited slip differential. Unfortunately, for many of those vehicles, the current production limited slip differential is simply not economically viable.

BRIEF SUMMARY OF THE INVENTION

Accordingly, it is an object of the present invention to provide an improved differential housing assembly for a vehicle differential, such as a limited slip differential, which results in a substantial reduction in the overall manufacturing cost of the housing assembly and, therefore, of the overall differential.

It is a related object of the invention to provide an improved differential housing assembly which results in a substantial reduction in the amount of machining required for the housing.

The above and other objects of the invention are accomplished by the provision of a differential gear mechanism of the type including a gear case defining an axis of rotation and a gear chamber. A differential gear means is disposed in the gear chamber including at least one input gear and first and second output gears. The gear case includes a first end cap defining a first hub portion disposed adjacent the first output gear and a housing defining a second hub portion disposed adjacent the second output gear.

The improved differential gear mechanism is characterized by the first end cap defining a plurality of openings arranged generally circumferentially about the axis of rotation. The housing defines a plurality of tabs adapted to be received in the openings defined by the first end cap. A means fixedly attaches the tabs and the housing relative to the openings and the first end cap.

DETAILED DESCRIPTION OF THE PREFERRED EMBODIMENT

Figure 1:
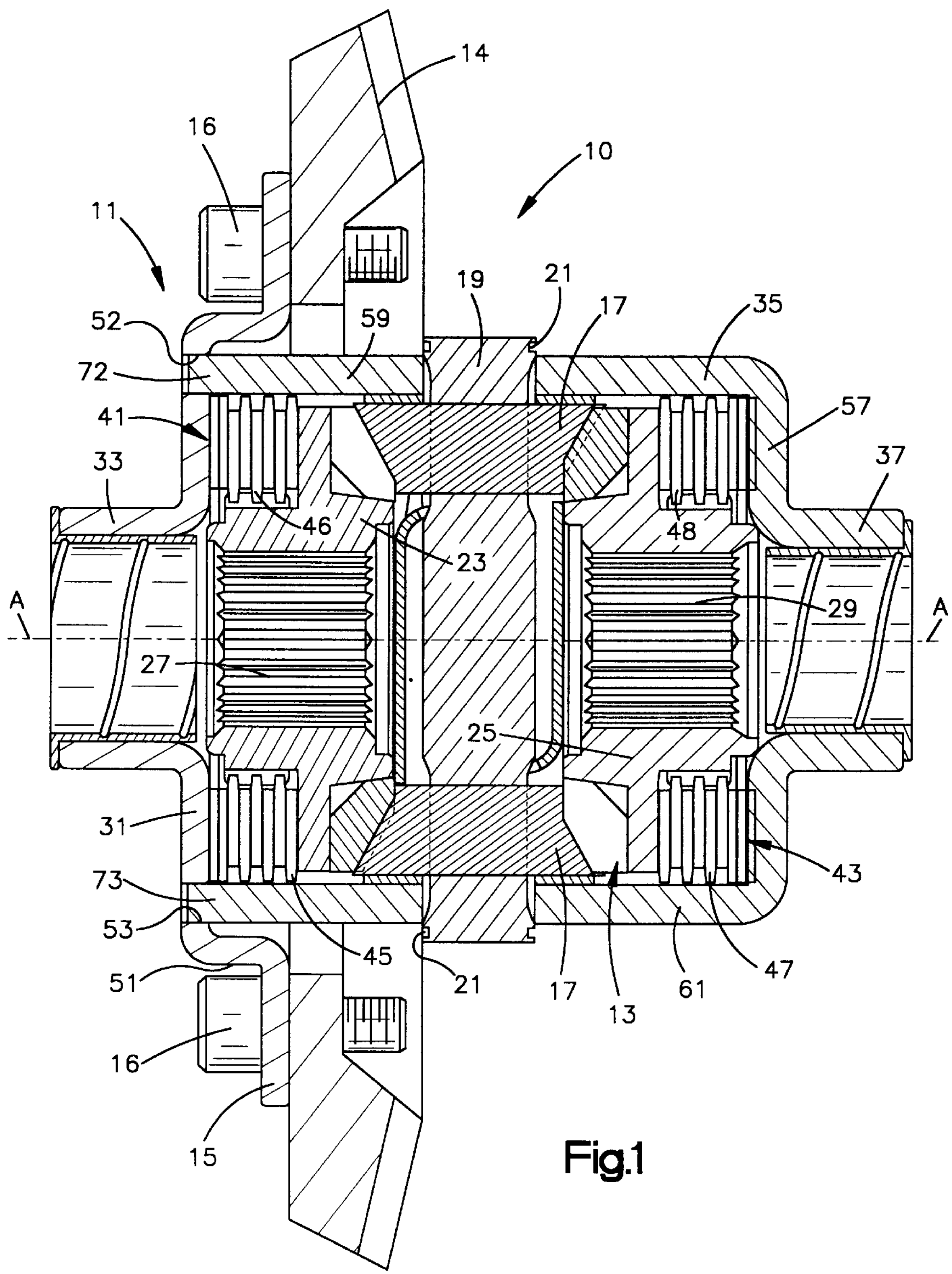
FIG. 1 is an axial cross-section of a limited slip differential made in accordance with the teachings of the present invention.

Referring now to the drawings, which are not intended to limit the invention, FIG. 1 is an axial cross-section of a limited slip differential of the type with which the present invention may be utilized. The construction and operation of the limited slip differential illustrated in FIG. 1 may be better understood by reference to U.S. Pat. No. 3,648,545, assigned to the assignee of the present invention, and incorporated herein by reference.

The differential gear mechanism, generally designated 10, includes a gear case (or differential housing) 11 which defines therein a gear chamber, generally designated 13. Torque input to the differential mechanism is typically by means of an input ring gear 14 which may be attached to a mounting flange 15 of the gear case 11 by any suitable means, such as by a plurality of bolts 16.

Disposed within the gear chamber 13 is a differential gear set including a pair of input pinion gears 17, which are rotatably supported on a pinion shaft 19. Typically, the pinion shaft 19 has been secured relative to the gear case 11 by any suitable means, such as a locking pin. However, it is probable that the means for securing the pinion shaft relative to the gear case will differ with the present invention, for reasons which will become apparent subsequently. Disposed adjacent each axial end of the pinion shaft 19 is a circular groove 21, of the type which is adapted to receive a snap ring or C-clip or other similar, suitable retaining member.

The pinion gears 17 are in meshing engagement with a pair of side gears 23 and 25. The side gears 23 and 25 define sets of internal, straight splines 27 and 29, respectively, which are adapted to be in splined engagement with mating external splines of a pair of axle shafts (not shown).

In accordance with an important aspect of the present invention, the gear case 11 includes an end cap 31, including an annular hub portion 33, and a housing member 35, including an annular hub portion 37. As is well known to those skilled in the art, the hub portions 33 and 37 may have mounted thereon a pair of bearing sets (not shown herein) which are used to provide rotational support for the differential mechanism 10 relative to an outer differential housing (also not shown herein).

As is also well known to those skilled in the art, during normal, straight ahead operation of the vehicle, no differentiation occurs between the left and right side gears 23 and 25, and therefore, the pinion gears 17 do not rotate relative to the pinion shaft 19. The gear case 11, the pinion gears 17, and the side gears 23 and 25 all rotate about an axis of rotation A as a solid unit.

Under certain operating conditions, such as when the vehicle is turning, or a slight difference in the tire sizes exists, it is permissible for a certain amount of differentiating action to occur between the side gears 23 and 25. As such differentiating action begins to occur, it is desirable to retard the relative rotation between the gear case 11 and the side gears 23 and 25, in order to prevent excessive differentiating action, which could lead to a spin-out of one of the drive wheels, resulting in loss of control of the vehicle.

In order to retard differentiating action, the limited slip differential 10 is provided with a clutch pack, generally designated 41, and a clutch pack, generally designated 43. The clutch pack 41 includes several friction discs 45 which are in engagement with the gear case 11, and more specifically with the housing member 35, and several friction discs 46 which are in splined engagement with the side gear 23. Similarly, the clutch pack 43 includes several friction discs 47 which are in engagement with the housing member 35, and several friction discs 48 which are in splined engagement with the side gear 25. It should be understood that, although the present invention is being illustrated and described in connection with a limited slip differential, the invention is not so limited, and the invention could be utilized in various other types of differential gear mechanisms, including, but not limited to, those of the open differential type, as well as limited slips that are specifically of the "locking differential" type. It is also quite possible that the present invention could be utilized with at least certain designs of "gearless differentials", which are also referred to as positive drive devices.

Figure 2:
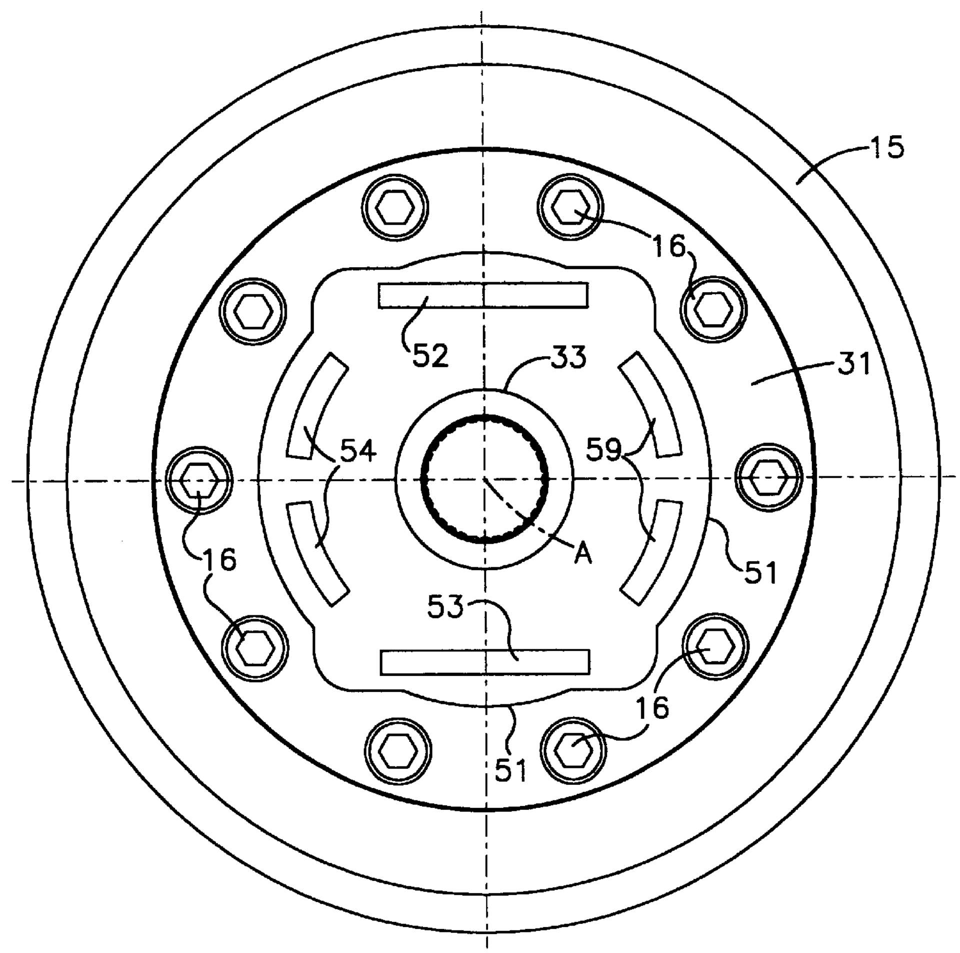
FIG. 2 is a plan view of the differential of FIG. 1, taken from the left in FIG. 1, and on a somewhat smaller scale.

Referring now primarily to FIG. 2, it may be seen that the end cap 31 defines a plurality of openings. Preferably, the end cap 31 comprises a stamped steel member having a periphery 51, inboard of the mounting flange 15 (see both FIGS. 1 and 2) which, as may best be seen in FIG. 2, is both somewhat circular and somewhat squared. Preferably, the end cap 31 has the mounting flange 15 formed integrally therewith, such that the various openings to be described may be pierced or stamped during the stamping of the end cap 31.

The end cap 31 defines upper and lower straight openings 52 and 53, respectively, and four arcuate openings 54. It should be understood by those skilled in the art that the particular configuration of the openings 52, 53 and 54 it is not an essential feature of the invention, but typically, the openings will be arranged generally circumferentially about the axis of rotation A, for reasons which will become apparent subsequently. It should be understood that references hereinafter, and in the appended claims, to the openings being arranged circumferentially does not require that the openings be in a truly circular pattern, but instead, includes any sort of arrangement around the axis of rotation A, as shown in FIG. 2, in which the openings surround the axis of rotation A.

Figure 3:
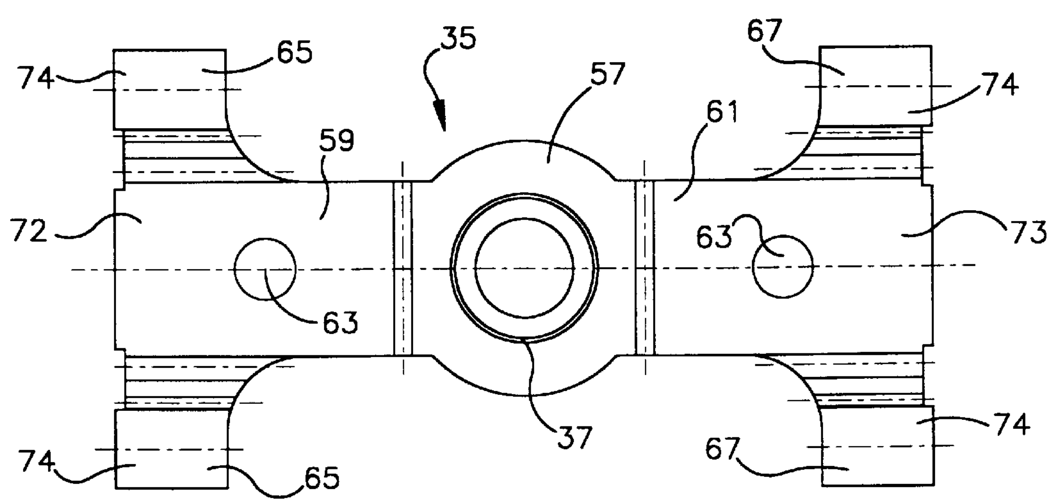
FIG. 3 is a plan view of the housing stamping, before it is formed to its final configuration.
Figure 4:
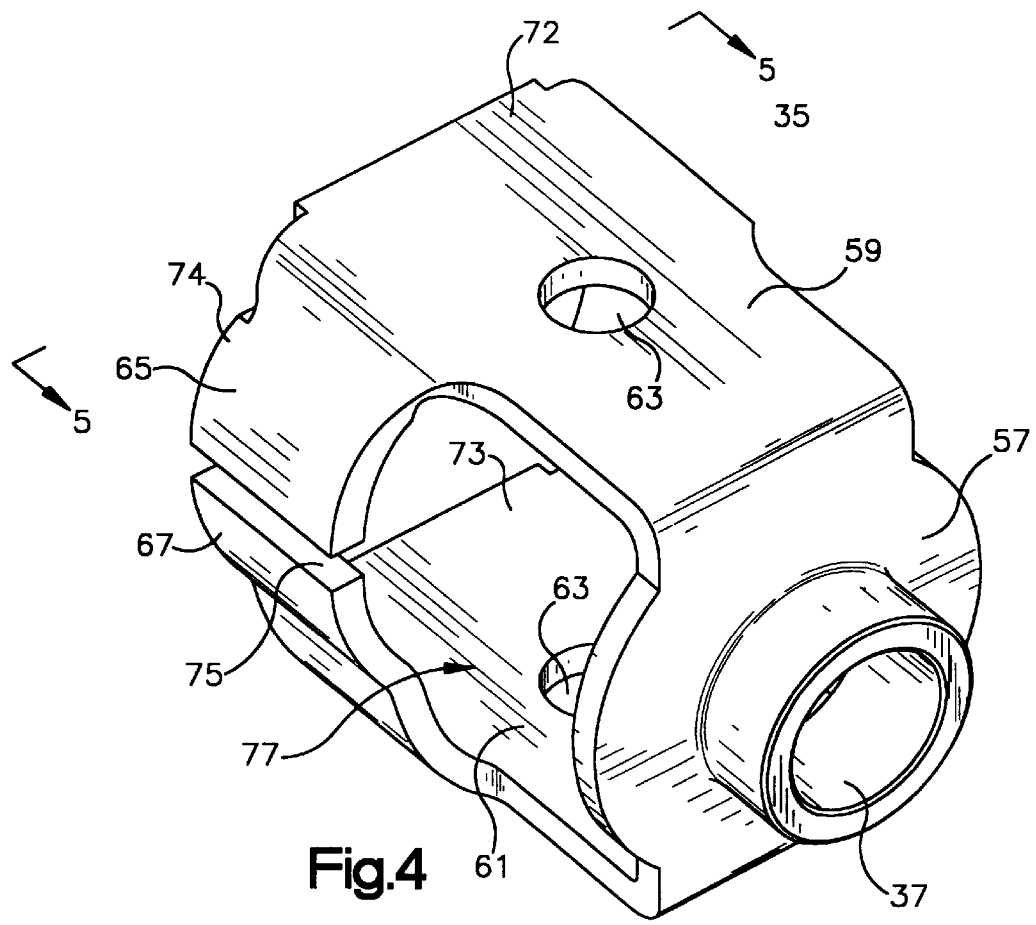
FIG. 4 is a perspective view, taken from the right in FIG. 1, of the stamped housing member alone.
Figure 5:
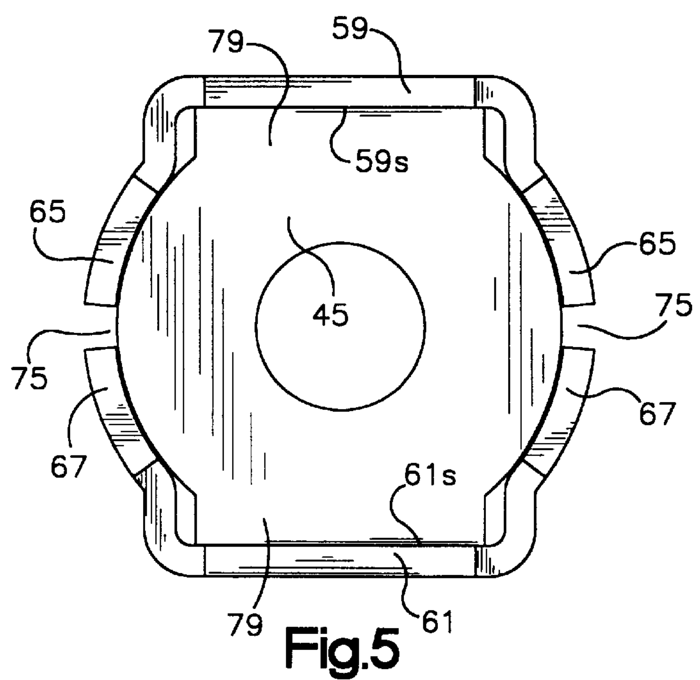
FIG. 5 is a transverse cross-section through the housing, and including one of the friction discs.

Referring now to FIGS. 3 through 5, another important aspect of the present invention will be described. In order to meet one of the objectives of the present invention, i.e., providing a differential gear mechanism having substantially reduced cost, the housing member 35 may comprise a one-piece steel stamping, which is initially stamped substantially as a flat, planar member as shown in FIG. 3, and then subsequently formed to its final configuration as shown in FIG. 4. Referring still primarily to FIGS. 3 and 4, the housing member 35 includes an end cap portion 57, including the annular hub portion 37. Attached to the end cap portion 57 is a pair of oppositely disposed upper and lower flat portions 59 and 61, respectively. Each of the flat portions 59 and 61 defines a circular opening 63 through which the respective end of the pinion shaft 19 extends, upon assembly of the differential mechanism 10. The upper flat portion 59 includes, toward its axial end a pair of side portions 65, which are ultimately formed as shown in FIGS. 4 and 5. Similarly, the lower flat portion 61 includes a pair of side portions 67 which are also ultimately formed as shown in FIGS. 4 and 5.

Referring again primarily to FIGS. 3 and 4, the upper flat portion 59 defines, at its axial end opposite the hub portion 37, an axial projection (or tab) 72. Similarly, the lower flat portion 61 defines an axial projection (or tab) 73. In addition, each of the side portions 65 and each of the side portions 67 defines an axial projection (or tab) 74, the tabs 74 being flat when the housing member 35 is initially stamped (as shown in FIG. 3), but the tabs 74 eventually having the same arcuate configuration as the respective side portions 65 and 67, after the stamping is formed to its final configuration as shown in FIG. 4.

After the housing member 35 is stamped, as shown in FIG. 3, it must then be formed into the final configuration, as shown in FIG. 4. The particular forming process is not an essential feature of the present invention, but in the subject embodiment, a "progressive" die arrangement is used. As is well known generally in the stamping and forming arts, progressive dies transform a work piece, such as the flat piece of FIG. 3, into the final configuration of FIG. 4 in a series of steps, in which each step performs a part of the overall forming process. For example, in one step, the side portions 65 and 67 would be bent "upward" out of the plane of FIG. 3 to the shape (relative to the flat portions 59 and 61) shown in FIG. 5. In another step, the flat portions 59 and 61 would be bent upward out of the plane of FIG. 3 to provide the overall general U-shape defined by the end cap 57 and the flat portions 59 and 61.

Referring now primarily to FIGS. 4 and 5, it should be noted that each pair of side portions 65 and 67 defines therebetween an axially extending gap 75 which opens into an access window 77 (only one of which is shown in FIG. 4). As is well known to those skilled in the art, the access windows 77 are utilized during assembly of the differential mechanism 10 to insert within the gear case 11 the pinion gears, the side gears and the clutch packs. It is one advantage of the present invention that, because the stamping comprising the housing member 35 has greater tensile strength than a typical casting, the access windows 77 may be relatively larger than in prior art differentials, thus facilitating the assembly process.

After the housing member 35 is formed to the configuration shown in FIGS. 4 and 5, the next step is to combine it with the end cap 31 to form the completed gear case or differential housing 11. In accordance with another important aspect of the present invention, the gear case 11 is assembled by inserting the straight tabs 72 and 73 into the straight openings 52 and 53, respectively, while at the same time inserting each of the arcuate tabs 74 into its respective arcuate opening 54. Preferably, this insertion step is performed with the assistance of appropriate fixturing so that each tab is in alignment with its respective opening. The use of one or more fixtures is also important to make sure that the annular hub portions 33 and 37 are substantially coaxial, after the tabs are inserted in the openings. This assembled condition is represented in FIG. 1 in which the straight tabs 72 and 73 are visible in their openings 52 and 53, respectively.

After the end cap 31 and housing member 35 are assembled, and preferably while they are still in the fixture, the assembly is completed by "fixing" in a permanent manner the tabs 72, 73 and 74 within the openings 52, 53 and 54, respectively. This may be done by any one of several known means and methods, but in the subject embodiment, the tabs are fixed within the openings by any one of a number of well known welding methods. Preferably, the welding step will be performed from the end cap end of the housing, i.e., from the left end in FIG. 1, so that any weld bead which is formed would be disposed within the opening 52, 53, or 54, as opposed to having a weld bead disposed inside the gear chamber 13, where it could interfere with the placement of the friction discs.

After the end cap 31 and housing member 35 are welded together, some machining is likely to be required. In the subject embodiment, the fully assembled gear case 11 is chucked on the outside diameters of the hub portions 33 and 37, after which the inside diameters are machined to desired dimension, then the hub portions 33 and 37 are chucked on the inside diameters, while the outside diameters are machined to desired dimension. In addition, there may be a ring gear pilot diameter associated with the mounting flange 15 which needs to be fairly accurately machined, for reasons which are well known to those skilled in the art. Finally, an inside surface of each of the flat portions 59 and 61, around the openings 63, typically needs to be machined as a seat for either the pinion gears 17 or for a backup washer disposed between the pinion gear and the adjacent flat surface.

Referring now primarily to FIG. 5, one additional advantage of the present invention may be seen. As is well known to those skilled in the art, it has been common practice in limited slip differentials for the friction discs which are fixed relative to the gear case to be provided with a plurality (typically four) of ears received within corresponding slots formed on the inside of the housing casting. However, because of the tendency for the disc ears to cause wear of the housing slot, it has been necessary to utilize hardened wear guards (also known as ear clips) surrounding the disc ears but protecting the housing slots, thus adding additional expense to the clutch pack, as well as to the assembly process. An important benefit of the present invention is that the stamped housing member 35 is able to retain the friction discs 45 and 47, without the need for any sort of clips or guards. As may best be seen in FIG. 5, each disc 45 (and each disc 47 as well) includes a pair of diametrically opposite "ears" 79, each of which defines a straight edge disposed immediately adjacent the flat, interior surface 59*s* and 61*s* of the flat portions 59 and 61.

Alternatively, and depending partially upon the thickness of the steel used for the end cap 31 and housing member 35, one or both of the hub portions 33 and 37 may comprise separate pieces. For example, the hub portion 37 may comprise a separate member, which is received within an opening in the endcap portion 57. Preferably, the separate hub portion is attached to its respective member by any suitable process such as MIG welding or spin (friction) welding.

Figure 6:
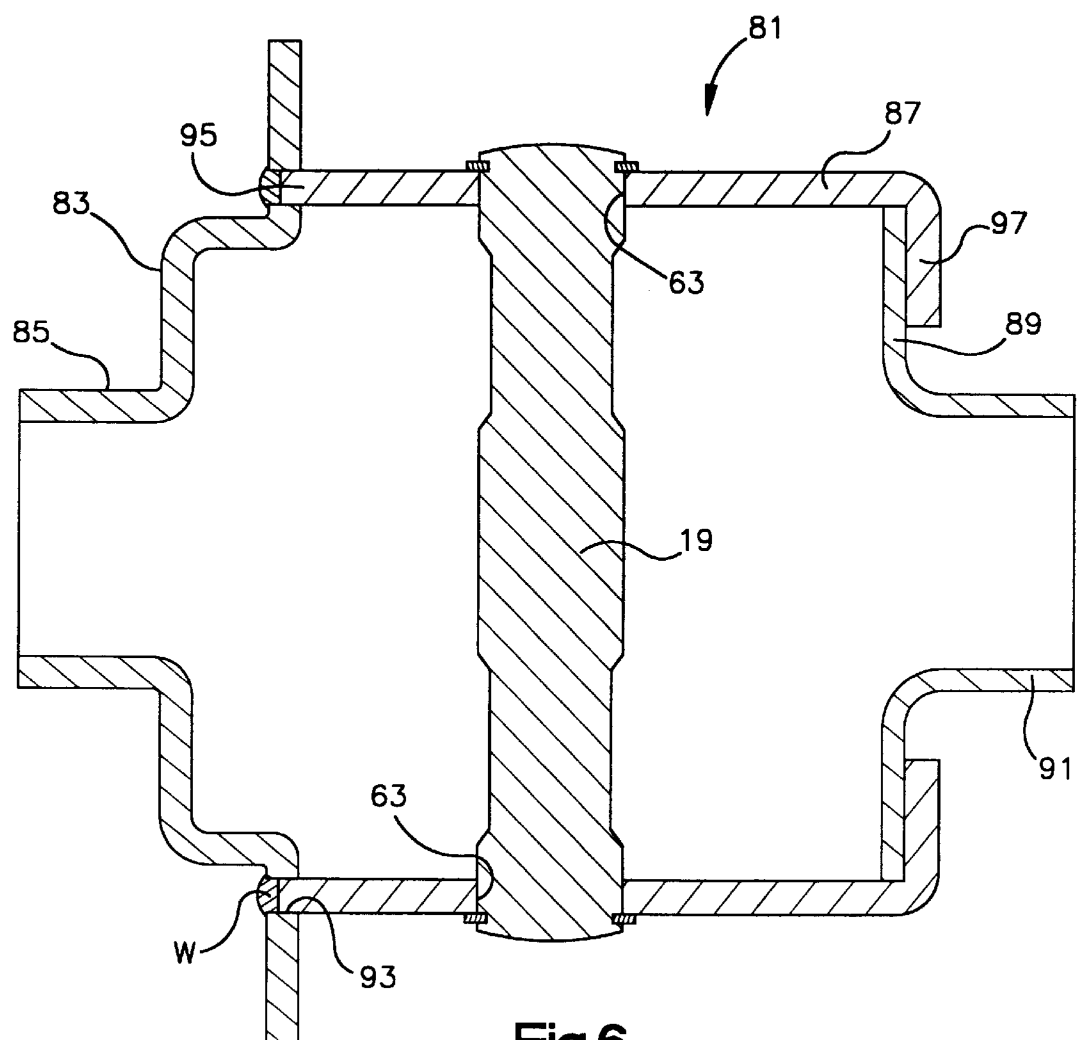
FIG. 6 is a transverse cross-section of a differential housing, generally similar to FIG. 1, illustrating an alternative embodiment of the present invention.
Figure 7:
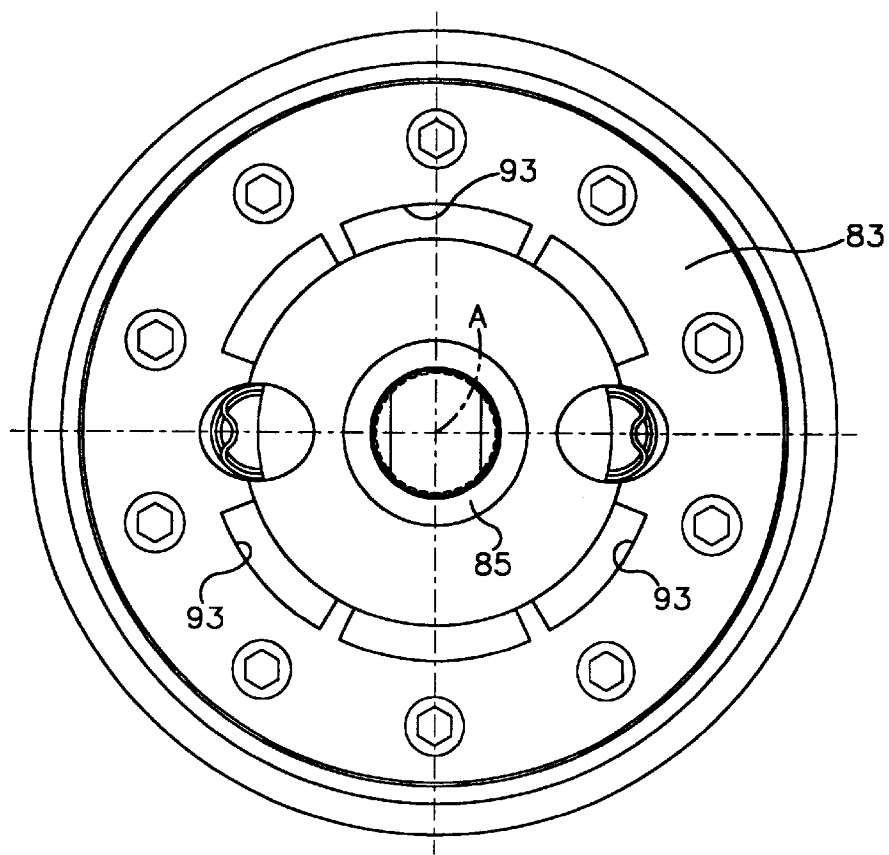
FIG. 7 is a plan view, similar to FIG. 2, of a limited slip differential including the differential housing shown in FIG. 6, but on a smaller scale than FIG. 6.
Figure 8:
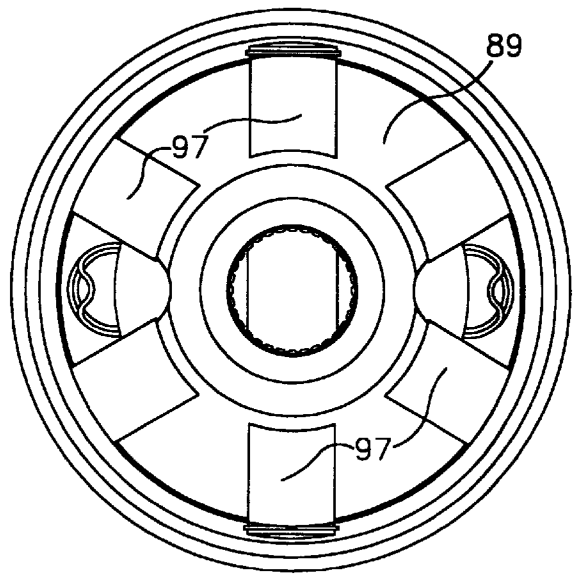
FIG. 8 is a plan view, taken from the right end of the differential of FIGS. 6 and 7, and on approximately the same scale as FIG. 7.

FIGS. 6–8 Embodiment

Referring now primarily to FIGS. 6 through 8, FIG. 6 illustrates a housing for a limited slip differential which may be substantially identical to the one shown in FIG. 1, but wherein the gear case comprises an alternative embodiment of the invention. In FIG. 6, there is a gear case, generally designated 81, comprising a stamped end cap 83 including an annular hub portion 85, and a housing assembly, comprising a housing member 87, and an end cap 89 including an annular hub portion 91. One significant difference between the embodiments of FIG. 6 and FIG. 1 is that the housing 87 is a cylindrical member (rather than somewhat U-shaped as is the housing member 35. Preferably, the housing 87 comprises a deep drawn steel stamping.

Referring now primarily to FIGS. 6 and 7, it may be seen that the end cap 83 defines a plurality of openings, and because the housing 87 is cylindrical, the openings in the end cap 83 are truly arranged in a circular pattern about the axis of rotation A. It should be understood that the particular size, shape and arrangement of openings is not, in and of itself, a critical feature of the invention. In the embodiment of FIGS. 6 through 8, the end cap 83 defines a plurality of arcuate openings 93, there being a total of six of the openings 93 shown in FIG. 7. At the left end (in FIG. 6) of the housing 87, the cylindrical stamping includes a plurality of projections or tabs 95 which preferably correspond in shape and location to the openings 93, in the same manner as in the primary embodiment. Those skilled in the stamping art will understand that, in both embodiments, it may be desirable for the tabs to be smaller than the respective openings, by an amount which is sufficient to insure that all of the tabs fit into the openings simultaneously, without the need to force the parts together. The above is part of the reason to hold the parts in appropriate fixturing as the parts are assembled and welded.

Referring now primarily to FIGS. 6 and 8, the housing 87 includes a plurality of tabs 97 which, upon initial drawing of the housing 87 lie in the cylinder of the housing, i.e., extending to the right in FIG. 6. The end cap 89 is generally circular, but the outside diameter as seen in FIG. 6 defines a series of notches, each of which is approximately the circumferential width of one of the tabs 97. Thus, when the housing 87 and end cap 89 are to be assembled, they are held in position, preferably by means of appropriate fixturing, and the tabs 97 are disposed in the notches defined by the end cap 89 and then are bent over the outside surface of the end cap 89 to the position shown in FIGS. 6 and 8, locking the housing 87 and end cap 89 together, in a rotational sense.

After the housing 87 and end cap 89 have been joined to form a housing assembly, the next step is to place that assembly and the end cap 83 together, in the position shown in FIG. 6, and then fix the tabs 95 within the openings 93. As was the case in the primary embodiment, this is preferably accomplished by means of a suitable welding process. After the entire housing assembly 81 is together as shown in FIG. 6 (but without the pinion shaft 19), the machining described in connection with the primary embodiment would typically be done.

Thus, the present invention provides several embodiments of an improved housing for use with a differential, wherein the housing assembly may comprise stampings, thereby reducing the normal tooling costs associated with the production of cast iron differential housings. It is considered likely that, for most designs, another benefit will be a stronger, but lighter, housing assembly.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A differential gear mechanism of the type including a gear case defining an axis of rotation and a gear chamber; differential gear means disposed in said gear chamber including at least one input gear and first and second output gears; said gear case including a first endcap defining a first hub portion disposed adjacent said first output gear and a housing defining a second hub portion disposed adjacent said second output gear; characterized by:

(a) said first endcap defining a plurality of openings arranged generally circumferentially about said axis of rotation;

(b) said housing defining a plurality of tabs adapted to be received in said openings defined by said first endcap;

(c) means fixedly attaching said tabs and said housing relative to said openings and said first endcap; and (d) said housing comprising a generally U-shaped member, a bottom portion of the U defining said second hub portion, and an upper portion of the U defining said plurality of tabs.

2. A differential gear mechanism as claimed in claim 1, characterized by means for limiting differentiating action of said differential gear means, including clutch means operable between a disengaged condition and an engaged condition, effective to retard relative rotation between said output gears and said gear case.

3. A differential gear mechanism as claimed in claim 2, characterized by said clutch means comprising a first plurality of clutch discs disposed axially between said first output gear and said first endcap, and a second plurality of clutch discs disposed axially between said second output gear and said housing.

4. A differential gear mechanism as claimed in claim 3, characterized by each of said first and second pluralities of clutch discs including at least one disc in engagement with said housing, and at least one disc in engagement with its respective output gear.

5. A differential gear mechanism as claimed in claim 1, characterized by said input gear being rotatably mounted on a pinion shaft oriented generally perpendicular to said axis of rotation, the opposite ends of said pinion shaft extending through openings in said housing.

6. A differential gear mechanism as claimed in claim 5, characterized by the side portions of the U defining said openings through which extend the opposite ends of said pinion shaft.

7. A differential gear mechanism as claimed in claim 6, characterized by a major portion of each of the side portions of the U being substantially flat and planar; said differential gear means including a pair of diametrically opposite input gears, each of said input gears comprising a flat-backed pinion gear disposed adjacent an inside surface of the adjacent side portion.

8. A differential gear mechanism as claimed in claim 1, characterized by said generally U-shaped member comprises a one-piece steel stamping, spaces between opposite side portions of the U defining diametrically opposed access windows.

9. A housing assembly, defining a gear chamber, for use with a differential mechanism of the type defining an axis of rotation; differential means and clutch means disposed in said gear chamber; said housing assembly including a first endcap defining a first hub portion disposed adjacent a first end, and a housing defining a second hub portion disposed adjacent a second end; characterized by:

(a) said first endcap defining a plurality of openings arranged generally circumferentially about said axis of rotation;

(b) said housing defining a plurality of tabs adapted to be received in said openings defined by said first endcap; and (c) a weldment fixedly attaching said tabs and said housing relative to said openings and said first endcap.

10. A housing assembly as claimed in claim 9, characterized by said housing comprising a generally U-shaped member, a bottom portion of the U defining said second hub portion, and side portions of the U defining said plurality of tabs.

11. A housing assembly as claimed in claim 10, characterized by the side portions of the U defining openings through which extend the opposite ends of a pinion shaft.

12. A housing assembly as claimed in claim 10, characterized by said generally U-shaped member comprises a one-piece steel stamping, spaces between opposite side portions of the U defining diametrically opposed access windows.

13. A housing assembly as claimed in claim 9, characterized by a major portion of each of the side portions of the U being substantially flat and planar; said differential means including a pair of diametrically opposite input gears, each of said input gears comprising a flat-backed pinion gear disposed adjacent an inside surface of the adjacent side portion.

14. A housing assembly as claimed in claim 9, characterized by said housing comprising a second endcap defining said second hub portion, and a generally tubular member having a first axial end defining said plurality of tabs, and a second axial end engaging and fixedly attached to said second endcap.

15. A housing assembly as claimed in claim 14, characterized by said second endcap defining a generally circular outer periphery, surrounded by and in engagement with said second axial end of said tubular member, said tubular member being generally cylindrical.

* * * * *